United States Patent [19]

Hanstein et al.

[11] 4,038,360
[45] July 26, 1977

[54] METHOD FOR CONTOURING THE SURFACE OF THERMOPLASTIC SYNTHETIC RESINS

[75] Inventors: Friedrich Hanstein, Gross-Zimmern; Theodor Peter Moench, Griessheim near Darmstadt, both of Germany

[73] Assignee: Rohm GmbH, Darmstadt, Germany

[21] Appl. No.: 728,543

[22] Filed: Oct. 1, 1976

[30] Foreign Application Priority Data

Nov. 28, 1975  Germany .............................. 2553573

[51] Int. Cl.² .......................... B29C 17/00; B29F 5/00
[52] U.S. Cl. .................................... 264/293; 264/299; 264/322
[58] Field of Search ............... 264/322, 320, 293, 284, 264/249, 316, 299; 425/DIG. 44, 352, 354, 394, 406, 411

[56] References Cited

U.S. PATENT DOCUMENTS

| 122,569 | 1/1872 | Chute | 264/293 |
|---|---|---|---|
| 1,813,235 | 7/1931 | Dunbar | 264/293 |
| 2,139,054 | 12/1938 | Wilson | 264/322 |
| 3,428,727 | 2/1969 | Higgins | 264/293 |

Primary Examiner—Willard E. Hoag
Attorney, Agent, or Firm—Curtis, Morris & Safford

[57] ABSTRACT

A method for contouring the surface of a thermoplastic synthetic resin sheet, which comprises contacting said sheet, warmed to the softening temperature of the synthetic resin, with a rigid structure having perforations therein and having a sheet of rubber or of a rubber-like synthetic resin foam in contact therewith on that side thereof which is opposite to said thermoplastic synthetic resin sheet, under pressure such that said synthetic resin sheet, in a thermoplastic condition, and said sheet of rubber or of synthetic resin foam penetrate into said perforations and come into substantially full surface contact with each other in said perforations.

4 Claims, 5 Drawing Figures

METHOD FOR CONTOURING THE SURFACE OF THERMOPLASTIC SYNTHETIC RESINS

The present invention relates to a method for contouring the surface of planar or domed sheets of a thermoplastic synthetic resin.

It is known in the art that this goal can be achieved in several ways. For example, in the preparation of a sheet of a thermoplastic resin by polymerization in a chamber, for example as discussed in German Pat. No. 639,095, one or both of the inner chamber walls can be provided with contours or profiles which approximate a negative image of the resultant synthetic resin sheet.

A surface contouring can also be associated with the preparation of a sheet by extrusion and, in particular, by bringing the synthetic resin, which is in a thermoelastic condition directly after emission from the extrusion nozzle, into contact with a form-imparting surface under sufficient pressure.

Starting with a plane parallel sheet, a surface ornamentation can be impressed into a material warmed to the deformation temperature. The tension-relieving working of the material with formation of a contoured surface should also be mentioned for sake of completeness.

It is possible, although this process is not disclosed expressia verbis in the state of the art, to consider it obvious to achieve a contouring of a surface by pressing together, in any desired fashion, a synthetic resin, warmed to the softening temperature, with a perforated surface structure under such a pressure that the synthetic resin, which is in the thermoelastic condition, penetrates into the perforations or — according to the thickness of the synthetic resin sheet to be contoured, its temperature, the pressure employed, and on the thickness of the "counter-sheet" which is perforated — also penetrates through these openings. As the tool which effects the contouring of a synthetic resin sheet, a metal plate into which bore holes have been drilled, or in which other openings have been introduced in some other fashion, can be used.

In this obvious process, when a metal plate having circular perforations, is used, for example, a sheet of thermoplastic synthetic resin is produced having raised hemispheres, independent of whether the synthetic resin only penetrates into the bore holes or, if a thinner pierced plate is used, completely goes through the perforations. Resin sheets which have been surface-contoured in this manner, for example from transparent acrylic resins, form structures which are useful for technical purposes or are useful in the field of lighting or in the preparation of advertising.

In particular cases, however, the formation of a contoured surface which, on deformation, extrudes into free space is not sought. Rather, it is more often sought, for example for esthetic reasons, to produce a surface structure in which, when using a perforated sheet having circular perforations, the raised portions of the surface have the form of cylinders. The surface of such a structure which is turned to an observer shows at least a slight matting effect which avoids disturbing reflection phenomena. By using a plate provided with polygonal perforations, for example rectangular, square, triangular, or hexagonal perforations, raised portions which either have the form of a rectangular solid, a truncated pyramid, or a hexagonal cylinder are to be formed. In each case the contoured surface, in contrast to the non-deformed zones of the synthetic resin sheet, does not reflect incident light or reflects it to only a small degree. Panes or sheets of this sort are characterized by effects which, according to heretofore-known processes, could not be achieved in a mass-produced product at an acceptable cost. The method of the present invention and the apparatus to be described permit the preparation of such surface structures in a simple manner.

A better understanding of the present invention and of the apparatus used for its performance can be had by referring to FIGS. 1–4 4 of the accompanying drawings.

Figure 1A:
FIG. 1a is a sectional view of a synthetic resin sheet prepared according to the present invention which is provided on one surface thereof with cylindrical raised portions having a circular or rectangular base.
Figure 1B:
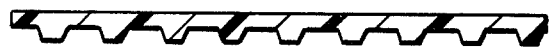
FIG. 1b shows a similar sheet but in which the raised portions have the form of truncated cones or pyramids rather than cylinders.
Figure 2:
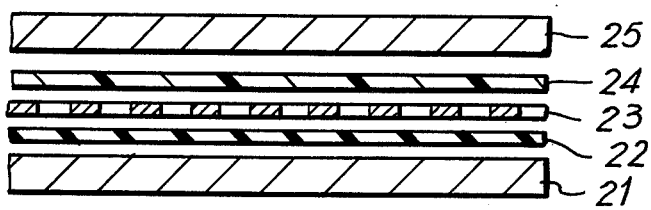

FIG. 2 shows base plate 21 of a press, mat 22 of rubber or of a rubber-elastic synthetic resin foam; perforated metal sheet 23 having circular or angular perforations, or perforations of any other form, therein; a sheet 24 of a thermoplastic resin raised to the deformation temperature; and stamping die 25 of the press.

Figure 3:
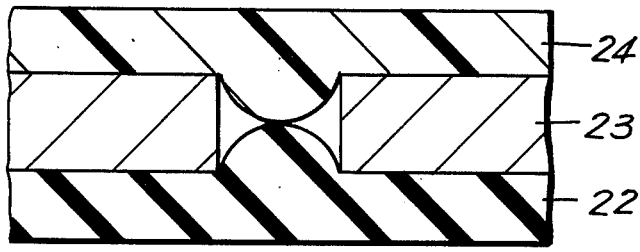

FIG. 3 shows, in an enlarged sectional view, the situation created at the moment in which press portions 21 and 25 (not shown) are brought together, wherein synthetic resin foam sheet 24 and underlying rubber or synthetic resin foam sheet 22 are deformed into the perforations of perforated plate 23 and come into contact. In this position, the bulges of the synthetic resin have a hemispherical form.

Figure 4:
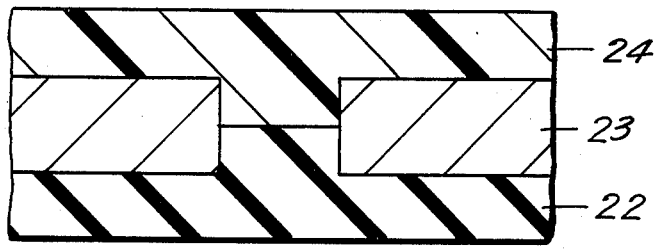

On further processing, the bulges in the synthetic resin assume the desired form, as shown in FIG. 4. That is, the raised hemisphere of FIG. 3, in the case of a circular perforation, is deformed into a right-circular cylindrical form, the surface of which, by contact with rubber or synthetic resin foam 22, takes on the shape shown in the drawing and simultaneously undergoes matting.

Thus, the method of the present invetion comprises pressing a sheet of a thermoplastic synthetic resin, raised to its softening temperature, into contact with a planar or domed structure which, in turn, is in contact with a sheet of rubber or of a rubber-like synthetic resin foam; and compressing them under such pressure that both materials; i.e. the synthetic resin and the rubber, penetrate into the perforations and touch in a form-imparting manner.

The thermoplastic resin, the surface of which is to be contoured according to the method of the present invention, can be an acrylic glass, i.e. a transparent acrylic resin, primarily a polymer exclusively or predominantly (more than 50 percent by weight) comprising methylmethacrylate, polystyrene, a polycarbonate, or some other thermoplastic or thermoelastic synthetic resin.

The method of the invention can be combined with the aforementioned extrusion process in such a manner that the contouring according to the invention follows directly after the extrusion process. One can proceed such that the extruded sheet runs out onto a perforated metal sheet under which a rubber mat is positioned. The resulting "package", comprising the deformable synthetic resin, the perforated metal sheet, and the rubber mat, is subsequently run between a calender roll pair. The synthetic resin, after cooling below the freezing temperature, is separated from the perforated sheet and the rubber mat in an obvious manner.

The rubber employed, including silicate rubber, or the rubbery elastic synthetic resin foam, for example a dense polyurethane foam, must of course be thermostable at the deformation temperature of the thermoplastic synthetic resin.

Among the thermoplastic synthetic resins to be deformed, those which already have found a role in advertising and in illumination technology should principally be mentioned, that is transparent acrylic resins, polystyrene, and polycarbonates.

It has already been pointed out that perforated metal sheets are suitable as the forming elements. However, perforated structures of some other material, such as glass, wood, or plastic, can be employed.

What is claimed is:

1. The method for contouring the surface of a thermoplastic synthetic resin sheet, comprising: disposing said sheet, softened by heat, in contact with an embossing sheet and adjacent at least one perforation between opposite major surfaces of said embossing sheet with a resilient backing sheet on a side of said embossing sheet opposite said thermoplastic sheet, thereby forming an assembly of said sheets, said resilient backing sheet being capable of being deformed so that portions thereof will flow under pressure into said at least one perforation; applying pressure to said assembly, against said thermoplastic and said backing sheets, causing portions of said thermoplastic sheet and said resilient backing sheet to flow into said perforation and make mutual contact therein across substantially the entire area of said at least one perforation; cooling said thermoplastic sheet below the softening temperature thereof and separating said thermoplastic sheet from said embossing sheet and said resilient backing sheet.

2. A method as in claim 1 wherein said thermoplastic synthetic resin is a transparent acrylic resin.

3. A method as in claim 4 wherein said embossing sheet having perforations therein is a perforated metal sheet.

4. The method of claim 1 wherein said embossing sheet has plural perforations and said method produces plural embossments on said thermoplastic sheet.

* * * * *